United States Patent [19]

Babinsky et al.

[11] 4,147,844

[45] Apr. 3, 1979

[54] REVERSE-SIDE TREATMENT OF FABRIC REINFORCED MEMBRANES

[75] Inventors: Andrew D. Babinsky, Chagrin Falls; Charles J. Hora, Painesville, both of Ohio

[73] Assignee: Diamond Shamrock Corporation, Cleveland, Ohio

[21] Appl. No.: 864,200

[22] Filed: Dec. 27, 1977

Related U.S. Application Data

[63] Continuation-in-part of Ser. No. 746,789, Dec. 2, 1976, abandoned.

[51] Int. Cl.² .............................. C08J 5/22; C08J 7/12
[52] U.S. Cl. .................................... 521/27; 156/306
[58] Field of Search .......................... 156/306; 521/27

[56] References Cited

U.S. PATENT DOCUMENTS 3,902,947  9/1975  Grot .................................... 428/421

FOREIGN PATENT DOCUMENTS 2510096  9/1975  Fed. Rep. of Germany .......... 156/306
48-33274 10/1973 Japan ..................................... 156/306

*Primary Examiner*—Joseph L. Schofer
*Assistant Examiner*—Peter Kulkosky
*Attorney, Agent, or Firm*—John P. Hazzard

[57] ABSTRACT

Disclosed are a sulfonyl group containing fluorocarbon polymer cation-exchange membrane which has been fabric reinforced and, on one side of which has been treated, after the fabric reinforcing has been applied in a heat-pressure application, to a depth of at least 10 microns with a primary amine or a secondary amine or mixtures thereof to aminate a majority of said sulfonyl groups.

7 Claims, No Drawings

REVERSE-SIDE TREATMENT OF FABRIC REINFORCED MEMBRANES

CROSS REFERENCE TO RELATED APPLICATION

This application is a continuation-in-part application of U.S. application Ser. No. 746,789, filed Dec. 2, 1976 now abandoned.

BACKGROUND OF THE INVENTION

A large portion of the chlorine and alkali metal hydroxide produced throughout the world is manufactured in diaphragm-type electrolytic cells wherein the opposed anode and cathode are separated by a fluid permeable diaphragm, usually of asbestos, defining separate anode and cathode compartments. In a typical operation, saturated brine is fed to the anode compartment wherein chlorine is generated at the anode, the brine percolating through the diaphragm into the cathode compartment wherein sodium hydroxide is produced at a concentration within the range of 11 percent to 18 percent and "contaminated" with large amounts of sodium chloride. The sodium hydroxide must then be concentrated by evaporation and the chloride must be removed to provide a commercial product.

Through the years, substitution of a membrane material for the diaphragm has been proposed. These membranes are substantially impervious to hydraulic flow. In operation, an alkali metal chloride solution is again introduced into the anode compartment wherein chlorine is liberated. Then, in the case of a cation permselective membrane, alkali metal ions are transported across the membrane into the cathode compartment. The concentration of the relatively pure alkali metal hydroxide produced in the cathode compartment is determined by the amount of water added to this compartment, generally from a source exterior the cell. While operation of a membrane cell has many theoretical advantages, its commercial application to the production, for example, of chlorine and caustic has been hindered owing to the low current efficiencies obtained and the often erratic operating characteristics of the cells.

More recently, much improved membranes have been developed to overcome many of the prior problems. The most promising such membrane is a thin film of fluorinated copolymer having pendant sulfonyl fluoride groups thereon such as described in U.S. Pat. Nos. 3,041,317; 3,282,875; and 3,624,053 and the like. Such membranes in hydrolyzed form are available from E. I. duPont de Nemours and Co. under the trademark NAFION.

These membranes can be further improved by surface treatments which consist of reacting the sulfonyl fluoride pendant groups with ammonia gas or more preferably with an amine which will yield less polar binding and thereby absorb fewer water molecules by hydrogen bonding such as described in detail in applicants' copending applications Ser. Nos. 587,047 and 686,179. The more efficient of these modified membranes are highly cross-linked and become extremely brittle especially in commercial dimension.

To further improve on these modified membranes a fabric reinforcing material has been laminated to such membranes by the application of heat and pressure. Such treatment, however, has resulted in improvement from a mechanical standpoint but is found lacking in that the heat and pressure required in the fabric bonding operation impairs if not completely destroys the effectiveness of the amine modified surface.

BRIEF SUMMARY OF THE INVENTION

Therefore, it is an object of the present invention to provide an efficient, non-brittle, fabric-reinforced, cation-exchange membrane for use in the production of chlorine and alkali metal hydroxide.

It is a further object of the present invention to provide a chloralkali cell employing a modified cation-exchange membrane, which cell operates at high current efficiencies and low voltages over a relatively broad range of operating conditions, and especially at high alkali metal hydroxide concentrations.

These and further objects of the present invention will become apparent to those skilled in the art from the specification and claims that follow.

Treatment of electrolytically-conductive, hydraulically impervious, cation permselective membranes in the precursor or sulfonyl fluoride form with ammonia, a primary amine or a secondary amine, or mixtures therefore to improve current efficiency in a chloralkali cell is known to applicants. Likewise, to reinforce such treated membrane by laminating thereon reinforcing fibers, fabrics or the like is known. However, two separate problems are encountered in such laminated fabric-reinforced membranes. First, some degree of damage to the aminated layer invariably occurs during the laminating step. This damage appears to be in the form of microcracks which occur in the aminated surface due to the heat and melt flow imposed on the membrane material in order to make it flow around the cloth reinforcing fibers even though the aminated surface is on the surface opposite that to which the reinforcing cloth is applied. If more heat and pressure are utilized to improve the melt flow of the membrane material to effect a better lamination, the damage to the aminated surface of the membrane is greatly increased.

The present invention overcomes both of these problems by performing a reverse-side surface treatment after the lamination step. By a reverse-side treatment is meant that the amination is effected onto the membrane surface into which the reinforcing cloth has been laminated rather than the surface opposite the reinforcing cloth as attempted earlier. Thus, the heat and pressure needed to effect the desired melt flow for proper lamination of membrane to the cloth reinforcing fibers can be applied without cracking the surface of the membrane. Furthermore, the after-treatment of the surface into which the reinforcing fabric has been encapsulated with primary amines, secondary amines or mixtures thereof effect some cross-linking of the polymeric membrane and thus chemically locks the reinforcing fabric to the membrane to some degree. This not only improves membrane performance by helping to avoid delamination, but also applies a continuous, uniform layer of aminated membrane which maximizes current efficiency.

DETAILED DESCRIPTION OF THE INVENTION

The fabric reinforced membrane cells to which the present invention applies, as well as the operating conditions thereof, are in many respects conventional. Generally, an enclosure is provided and divided into two compartments by the modified membrane material. In one compartment is disposed an appropriate cathode, generally a metallic material, such as mild steel and the like. The other compartment contains the anode-a conductive, electrocatalytically active material, such as graphite or, more desirably, a dimensionally stable anode, e.g., a titanium substrate bearing a coating of a platinum group metal, platinum group metal oxide, or other electrocatalytically active, corrosion-resistant material. The anode compartment is provided with an outlet for generated chlorine gas, an inlet for alkali metal chloride (i.e., NaCl or KCl) solution, and an outlet for depleted electrolyte. Similarly, the cathode compartment will have outlets for liquid and gaseous products and, generally, an inlet through which water and/or an alkali metal hydroxide solution may be added. In operation, a direct current, generally on the order of from 15 to 45 amperes per square decimeter of membrane, is passed between the electrodes, causing the generation of chlorine at the anode and the selective transport of hydrated alkali metal ions across the membrane into the cathode compartment wherein they combine with hydroxide ions formed at the cathode by the electrolysis of water, hydrogen gas being liberated.

The fabric reinforced membrane of the present invention is generally derived from (i.e., results from the amination and saponification of) any fluorinated polymer having pendant side chains bearing sulfonyl groups attached to carbons, on each of which carbons there is at least one fluorine atom. The fluorinated polymers are prepared from monomers that are fluorinated or fluorine-substituted vinyl compounds. They are made from at least two monomers with at least one of the monomers coming from each of the groups (1) fluorinated vinyl compounds, such as vinyl fluoride, hexafluoropropylene, vinylidene fluoride, trifluoroethylene, chlorotrifluoroethylene, perfluoro (alkyl vinyl ether), tetr fluoroethylene, and mixtures thereof, and (2) a sulfonyl-containing monomer containing the precursor —SO$_2$F. Exemplary are CF$_2$=CFSO$_2$F and, generically, CF$_2$=CFY$_f$SO$_2$F, wherein Y$_f$ is a bifunctional perfluorinated radical containing from 2–8 carbon atoms.

The preferred of hydraulically impermeable membrane which can be used in the practice of the present invention is a thin film of fluorinated copolymer having pendant sulfonyl fluoride groups. The fluorinated copolymer is derived from monomers of the formula $$CF_2=CF-(R)_n-SO_2F \quad (1)$$

in which the pendant —SO$_2$F groups are converted to —SO$_3$H groups in use, and monomers of the formula $$CF_2=CXX' \quad (2)$$

wherein R represents the group

$$-CF(R')-CF_2-O-(CFY-CF_2O)_m-$$

in which the R' is fluorine or fluoroalkyl of 1 through 10 carbon atoms; Y is fluorine or trifluoromethyl; m is 1, 2 or 3; n is 0 or 1; x is fluorine, chlorine or trifluoromethyl; and x' is x or CF$_3$-(CF$_2$)$_z$O—, wherein z is 0 or an integer from 1 to 5.

This results in copolymers used in the membrane for the cell having the repeating structural units.

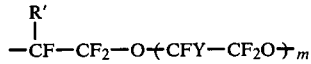
$$-CF_2-CF(R)_n-SO_3H- \quad (3)$$

and  $-CF_2-Cxx'-$  (4)

In the copolymer there should be sufficient repeating units according to formula (3) above, to provide an —SO$_3$H equivalent weight of about 800 to 1600 with a preferred range of 1000 to 1400. Membranes having a water absorption of about 25% or greater are preferred since higher cell potentials at any given current density are required for membranes having less water absorption. Similarly, membranes having a film thickness (unlaminated) of about 8 mils or more, require higher cell potentials in the process of the present invention and thus have a lower power efficiency.

Because of large surface areas of the membranes present in commercial cells, the membrane film will be laminated to and impregnated into a hydraulically permeable, electrically non-conductive, inert, reinforcing member, such as a woven or non-woven fabric made of fibers of asbestos, glass, TEFLON, or the like. In film-/fabric composite membranes, it is preferred that the laminating produce an unbroken surface of the film resin on at least one side of the fabric to prevent leakage through the membrane.

The hydraulically impermeable cation-exchange membranes of the type in question are further described in the following patents which are hereby incorporated by reference: U.S. Pat. Nos. 3,041,317; 3,282,875; 3,624,053; British Pat. No. 1,184,321 and Dutch Published Application 72/12249. Membranes in hydrolyzed form as aforedescribed are available from E. I. duPont de Nemours and Co. under the trademark NAFION.

These fabric reinforced membranes, in the unhydrolyzed sulfonyl form and generally having a thickness of from 75 to 250 microns, especially 125 to 200 microns, are then treated with primary or secondary amines as disclosed in applicants' copending U.S. application Ser. No. 587,047 filed June 16, 1975 and Ser. No. 686,179 filed May 13, 1976; with mixtures of a polyamine and another amine as disclosed in applicants' copending U.S. application Ser. No. 746,662 filed Dec. 2, 1976; or with combinations of the same.

Amine chemical surface treatment of the sulfonyl fluoride precursor of such fabric-reinforced NAFION membranes has been shown to be a practical method for increasing the current efficiency in a chloralkali cell. Generally, these amine surface treatments consist of reacting the sulfonyl fluoride pendant groups with amines that will yield less polar bonding and thereby absorb fewer water molecules by hydrogen bonding. This tends to narrow the pore openings through which the cations travel so that less water of hydration is transmitted with the cation through the membrane. All reactive amines, including primary and secondary amines as well as mono, di, tri and tetra amines and ammonia modify the membranes to improve current efficiency and minimize OH$^-$ transport to varying degrees. Generally, amines which more highly cross-link the polymeric membrane best minimize —OH transport through the membrane. Likewise, lower molecular weight cross-linking amines, particularly ethylene diamine, perform better at minimizing OH$^-$ transport than higher molecular weight cross-linking amines. The general corollary that can be drawn is that the greater the cross-linking with amines the better the cation transmission in the forward direction with less hydroxyl ion backmigration.

Polyamines alone produce extensive cross-linking, good cell voltage, excellent current efficiency and is easy to reproduce. Among the polyamines, ethylenediamine is the best with improvement falling off as the branching of the amine increases, length of the cross-link increases, and molecular weight increases.

In the practice of the instant invention, the reverse side, i.e., side of the membrane into which the reinforcing fabric has been encapsulated, of the precursor of a fabric-reinforced NAFION membrane (in $-SO_2F$ form) is treated by exposing said one side thereof to a solution of the desired amine until a treatment depth of about one to three mils, preferably 1½ to 2 mils, is obtained. Treatment time may range from about 5 minutes to about 2 hours, depending on the temperature of the treatment and the amine that is used. The treatment depth may be determined by cutting a thin section from the treated membrane, staining with 'Sevron' Red ®, and then examining it microphotographically.

Generally, the amine is preferably made up of a polyamine and a monoamine, such as a mixture of ethylenediamine and n-butylamine. However, as stated earlier the monoamine can be replaced by another polyamine other than ethyldiamine. For example, ethylene diamine is the most active cross-linker in terms of both results that improve current efficiency and embrittle the membrane and propylene diamine is somewhat close thereto. Even utilizing a mixture of ethylene diamine and propylene diamine, the resulting membrane is less brittle than that produced using only ethylene diamine.

The lamination of a reinforcing fabric to the polymeric membrane can be accomplished by any of the methods known in the art, it being the essence of the instant invention that the surface amination be applied after the lamination. Typically, the membrane to be laminated to a reinforcing fabric is first heated to a temperature of 300° to 340° C. to give sufficient melt flow to allow the membrane material to flow partially through the fabric and form a uniform, continuous surface on the other side of the fabric. Normally, heated platens using infrared heating or the like are used to assist the flow through the membrane so as to produce an effective lamination.

As stated earlier, the teachings of the prior art is to laminate a reinforcing fabric to a membrane which has already had its cathode side or surface aminated. The heat applied to obtain the necessary melt flow of the membrane to laminate the same to the reinforcing fabric at least partially destroyed the effect of the aminated layer or surface. Basically, it appears that the heat and pressure required to make even a mediocre laminate is too severe for the aminated layer to undergo without developing microcracks in the aminated surface. More severe laminating conditions result in better laminates but the condition of the aminated layer further deteriorates. The two problems overlap in that the aminated surface of the membrane evidences deterioration due to the imposed temperatures even when laminating conditions are such as not to result in an acceptable laminate.

It was originally believed that such reverse side backside amination was not possible since fiber encapsulation is generally not complete, which would possibly provide a route for extensive backmigration of hydroxide to occur. Surprisingly, however, microscopic examination shows that the amine layer actually penetrates the hills and valleys of the flawed areas around the fibers and develops a highly uniform thickness of aminated membrane while also cross-linking the polymer.

The technique of the instant invention is particularly applicable to the sulfonyl fluoride precursors of the 1100 and 1200 equivalent weight "NAFION" membranes.

As is well known from the issued patent and copending applications, a wide variety of amines can be employed in the present invention. Typical examples thereof include ethylenediamine, propylenediamine, butylenediamine, diethylene triamine, dipropylene triamine, triethylene tetramine, methylamine, ethylamine, n-butylamine.

A typical and preferred amine mixture that is useful in the practice of the present invention is n-butylamine and ethylenediamine. The mixture is prepared by measuring the desired volumes of the two amines, combining them and mixing them until uniform; one part of water is then added to approximately 20 parts of the prepared mix on a volume to volume basis and again mixed until uniform. The ratio of n-butylamine to ethylenediamine may range from about 3:1 to 1:4; the preferred ratios are in the 2:1 to 1:3 range. The amount of water that is added to the amine mixture may vary from about 1:15 to 1:200.

After treatment with the mixed amine system, the membranes are hydrolyzed in an NaOH or KOH solution, soaked in water and dilute NaOH, and then installed in the test cells with the treated side of the membane facing the catholyte. All tests were made with a 3" by 3" membrane at 2 amperes per square inch current density. Voltage ranged from 3.9 to 5.2 while current efficiency ranged from 98 percent to 80 percent during the tests. Generally, current efficiency was highest when the cell is first placed in service and gradually drops over a period of several months. Tests were terminated when the current efficiency dropped to about 80 percent.

EXAMPLE

A piece of the sulfonyl fluoride precursor of NAFION membrane 427—a homogeneous film 7 mils thick of 1200 equivalent weight perfluorosulfonic acid resin laminated with T-12 fabric of polytetrafluoroethylene resin—was treated to a depth of 1.0 to 1.5 mil with ethylene diamine. The procedure used was as follows: A piece of the above membrane of the appropriate size was cleaned with a minimum amount of methyl alcohol and installed in the treatment apparatus. The membrane was treated on the surface into which the T-12 fabric was encapsulated with 36 ml 18:1 ethylene diamine to water (volume to volume) at ambient temperatures, 22° C. for 110 minutes. The membrane was thereafter flushed thoroughly with water and a thin section of the treated area was stained with 'Sevron' Red ® and the depth of treatment was measured as 1.2 mil.

The resulting membrane was saponified with 13 percent NaOH in dimethylsulfoxide and water at 85°–90° C. for 85 minutes, washed thoroughly with water, and then hydrolyzed in dilute NaOH at room temperature for 30 minutes. After washing the membrane was placed in a chloralkali cell wherein it operated for an extensive period at consistently high current efficiencies without any signs of delamination.

While the invention has been described with reference to certain preferred embodiments thereof, it is not to be so limited since changes and alterations may be made therein which are well within the intended scope of the appended claims.

What is claimed is:

1. A process for the preparation of a fabric reinforced ion exchange membrane which comprises heating a fluorinated polymeric material containing pendant side chains containing sulfonyl groups, said sulfonyl groups being attached to carbon atoms which have at least one fluorine atom attached thereto, to a temperature resulting in sufficient melt flow of said polymer to permit laminating of an open mesh reinforcing fabric thereto; applying an open mesh reinforcing fabric to one surface of said heated fluorinated polymer with sufficient pressure to cause a melt flow of said polymer to at least partially through said fabric to form a laminate, and thereafter treating said one surface of said fluorinated polymer with an aminating compound selected from the group consisting of primary amines, secondary amines and mixtures thereof so that a majority of the sulfonyl on said first surface are converted to the —SO$_2$N— form to a depth of at least 10 microns.

2. A process as stated in claim 1 wherein the aminating compound is ethylenediamine.

3. A process as stated in claim 1 wherein the aminating compound is a mixture of ethylenediamine and n-butylamine.

4. The process of claim 1 wherein said fluorinated polymeric material is a film of a fluorinated copolymer having pendent sulfonyl groups and containing recurring structural units of the formula:

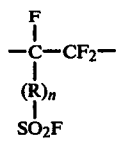
(1)

and

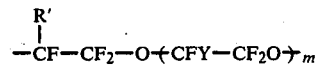
(2)

wherein R represents the group $$-CF-CF_2-O-(CFY-CF_2O)_m$$
with R' on the first CF in which R' is fluorine or perfluoroalkyl of 1 to 10 carbon atoms, Y is fluorine or trifluoromethyl, and m is 1, 2 or 3, n is 0 or 1; X is fluorine, chlorine, hydrogen or trifluoromethyl; and X' is X or CF$_3$-(-CF$_2$-)$_z$O wherein z is 0 or an integer from 1 to 5;

said fluorinated ion exchange material is heated to a temperature between about 300 and 340° C.;

and said open mesh reinforcing fabric is made of polytetrafluoroethylene.

5. A fabric-reinforced ion exchange membrane comprising a fluorinated polymer film, said polymer film containing side chains containing sulfonyl groups, said sulfonyl groups being attached to carbon atoms which have at least one fluorine atom attached thereto; one surface of the film having a majority of the sulfonyl groups of the polymer to a depth of at least 10 microns having been reacted with an aminating compound selected from the group consisting of primary amines, secondary amines and mixtures thereof wherein said aminated surface is continuous and free of microcracks therethrough and said one surface having embedded therein an open mesh reinforcing fabric.

6. A fabric-reinforced polymeric membrane as stated in claim 5 wherein the aminating compound is ethylenediamine.

7. A fabric-reinforced polymeric membrane as stated in claim 5 wherein the aminating compound is a mixture of ethylenediamine and n-butylamine.

* * * * *